UNITED STATES PATENT OFFICE.

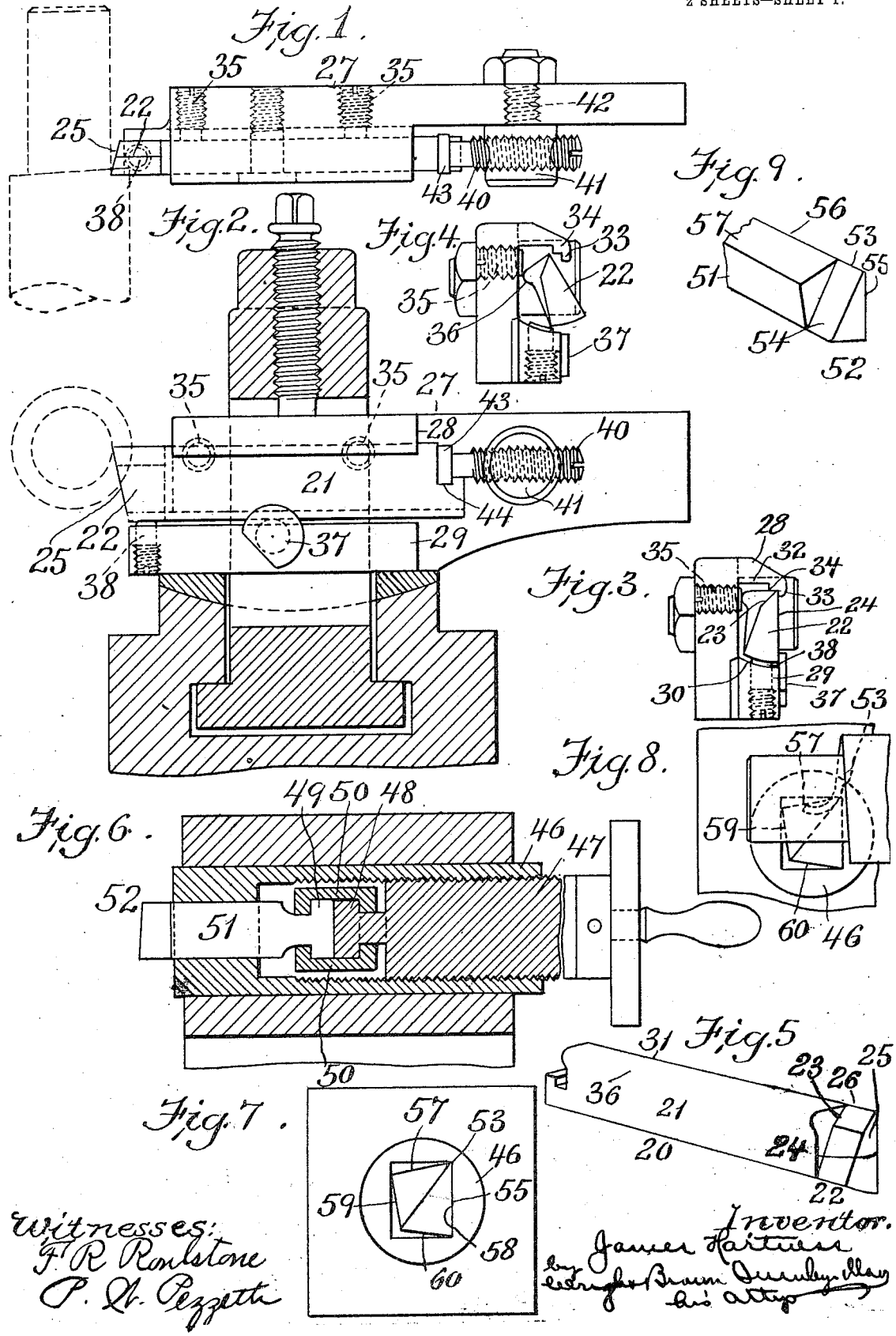

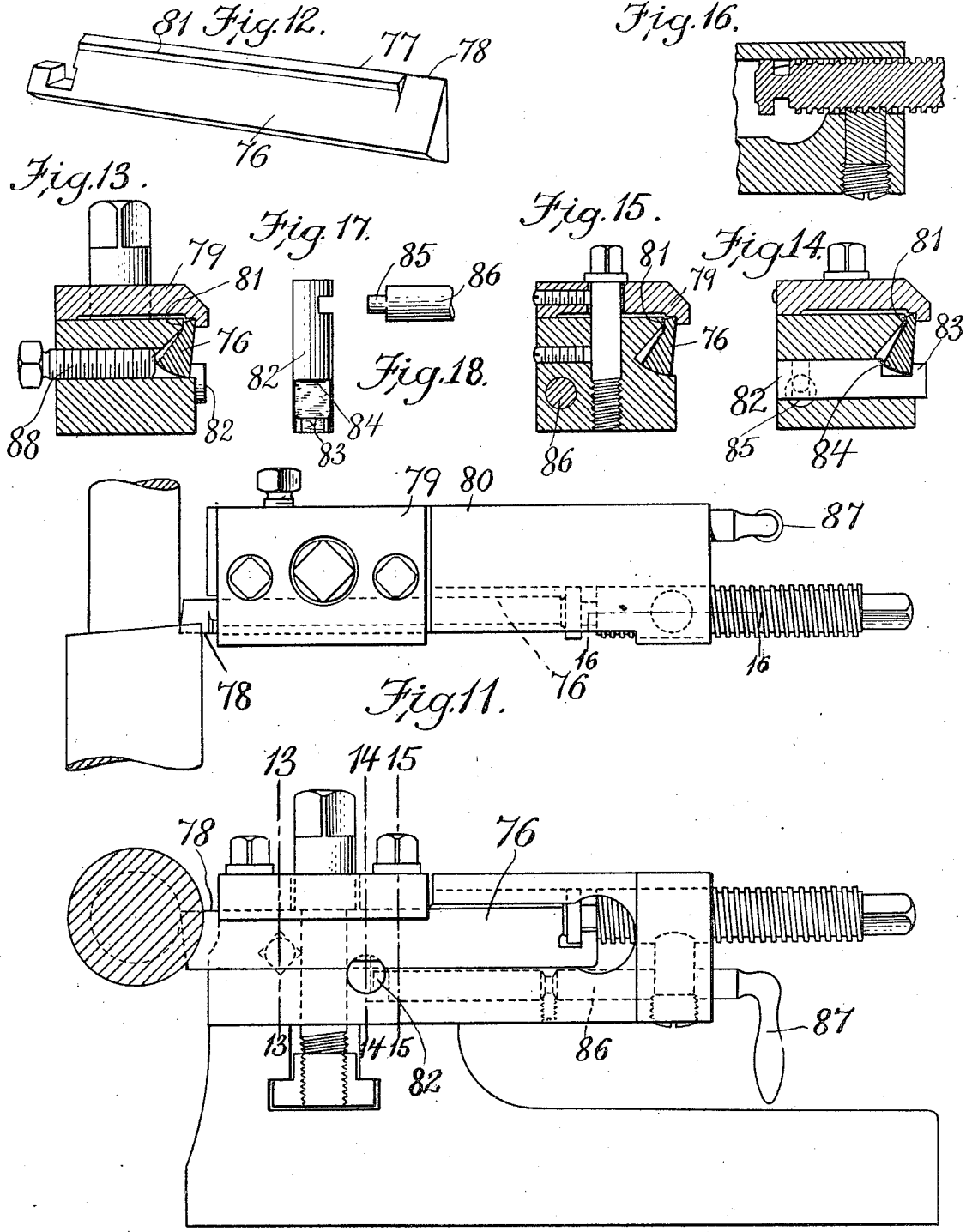

JAMES HARTNESS, OF SPRINGFIELD, VERMONT.

METAL-TURNING TOOL.

1,036,101.

Specification of Letters Patent.

Patented Aug. 20, 1912.

Application filed September 9, 1908. Serial No. 452,308.

*To all whom it may concern:*

Be it known that I, JAMES HARTNESS, of Springfield, in the county of Windsor and State of Vermont, have invented certain new and useful Improvements in Metal-Turning Tools, of which the following is a specification.

This invention has relation to the art of cutting metals as practised in metal working machines, such as engine lathes.

In order that the invention may be understood, it is necessary to explain the action of the cutters which have been used in accordance with the general practice. In this kind of work, the cutter is usually carried by a holder which makes possible its adjustment laterally and longitudinally in relation to the work, so that it may be caused to turn any diameter and to be positioned longitudinally of the work; and although the cutter is provided with adjustments for such motions, it is usually so formed and held that the angles of the various faces of the cutting nose of the tool remain fixed in relation to the work. For instance, a cutting tool according to the general practice has been given what is called a clearance; that is, the face of the tool under the cutting edge stands at a slight angle to the wall of metal from which the chip is being taken, so that only the extreme edge of this clearance face (which edge forms the cutting edge) is in contact with the metal. This universal practice of giving a lathe tool a clearance subjects the cutting edge to a one-sided pressure. This, in turn, necessitates the employment of very blunt-edged tools capable of withstanding such one-sided pressure. It is obvious that a cutting edge should never be subjected to lateral stress. A cutting edge will stand an enormous strain if the pressure is equalized against both faces thereof. It is well known that hardened steel may be subjected to an enormous compression stress, but that a thin edge of hardened steel has very little lateral strength. But, as stated, the universal practice gives a cutting tool a clearance, and then, of course, it is necessary to sacrifice what would otherwise be a very desirable feature, to wit, a wedge-shaped cutting edge, measuring say from 30° to 45°. In actual practice, it is customary to employ a tool having a clearance angle of about 10° and a top slope of about 15°, leaving the lip angle of the tool 65°, so that the cutting angle, measured from the face of the work to the top slope, is approximately 75°; that is, the face of the tool which should plow off the chip of metal, instead of standing at a desirable angle of say 30° or 45°, stands at an angle of 75°. The action of blunt tools makes the process of turning, a scraping action, in which the metal is crushed and crowded off from the face of the work.

In a cutting tool, the ideal condition may be approximated by holding one face of the cutter flatly against some unyielding face which will support the edge, whereby any pressure on the outer edge, instead of bending or breaking the edge sidewise, presses it firmly against the unyielding face, so that the resultant pressure on its edge is downward in line midway between said faces.

I have found that the lateral or one-sided pressure upon the cutter may be substantially obviated by permitting the inner or so-called clearance face to bear flatly against the wall of metal from which the chip is being removed, so that the pressure on the two faces of the cutter may be practically equalized.

Having reduced the cutting stress on the cutting tool to a compression stress, it is now possible to give the cutting edge the ideal wedge shape, so that it passes through the metal, wedging off its chip instead of scraping or crowding off the metal. The acute angle removes the chip with the slightest structural change in the metal of the chip. Blunt angle tools on the contrary produce a chip which is a series of chunks more or less firmly united, and in such cases the thickness of the chip is generally double the thickness of the feed, and the length of the chip approximately half the length of the metal in its original form around the bar.

In order to make it possible to use a cutter without clearance, that is to allow a large area of the so-called clearance face to contact or bear flatly against the wall of metal from which the chip is being removed, the cutter is allowed a slight angular freedom so that it can oscillate for this purpose only. Otherwise, the tool is held and controlled rigidly so that it is under perfect control of the carriage, so far as the relation of its cutting edge to the work both laterally and longitudinally is concerned. Of course, this oscillation must be about a center line substantially coincident with the cutting edge of the tool, so that a change of angular position does not appreciably change the exact location of the edge. The amount of angular motion required is very slight, and abutments are provided to control the tool within fixed limits, and means if necessary are employed to allow the tool to start into its cut with a slight clearance, but as soon as the tool has entered its cut, in order to put it into its strongest and most durable position, it may be swung by hand or other means so that the inner face bears flatly against the metal of the work. In some work, the chip throws the tool into its position automatically, but in all work it tends to hold the tool there when it is so located.

For simplicity in illustrating the invention, I have chosen to show tools, the plan view of the top edge of which shows the two so-called clearance faces at substantially an angle of 90°, but it will be understood that the corner of the tool may be rounded or of any desired shape, and that it is preferred to mount the tool movably so as to bring the center line of oscillation approximately along and in line with the top edge of the most acute part of the tool, where the thickest portion of the chip is being removed. It is apparent, however, that, in certain kinds of work, this center of movement or oscillation may be put above, below, forward or back of the center line of this particular part of the tool; and for a certain particular reason hereinafter stated, the line of center of oscillation may not pass along nor be exactly parallel with the line of the top edge of the cutter.

Upon the accompanying drawings, there is illustrated a variety of different tools embodying the invention.

Figure 1 represents a plan view of one form of the invention. Fig. 2 represents a longitudinal section therethrough. Figs. 3 and 4 represent end views respectively, showing the cutter in place and being removed. Fig. 5 represents the cutter. Fig. 6 represents a section through another form of tool embodying the invention. Fig. 7 represents an end elevation thereof. Fig. 8 represents the cutter as engaged with the work. Fig. 9 shows the end of the cutter. Fig. 10 illustrates in side elevation another embodiment of the invention. Fig. 11 represents a plan view thereof. Fig. 12 illustrates the cutter. Figs. 13, 14 and 15 respectively, represent sections on the lines 13—13, 14—14, and 15—15 of Fig. 10. Fig. 16 represents a longitudinal section on the line 16—16 of Fig. 11. Fig. 17 represents the slide for moving the cutter about its axis of oscillation. Fig. 18 represents the end of the shaft which operates said slide.

It is known that the top slope or outer surface of the tool should be at as acute an angle as possible to the natural travel of the work so as to present the most favorable surface for lifting off the chip, yet it has been found in practice that, with a tool having a clearance, it is impossible to give this slope an angle that will lift the chip. It only scrapes it and pushes before it the metal in chunks which are crushed or sheared off from the work before the tool, and not actually by the edge thereof. The ideal instrumentality for removing the chip from the work is a wedge. The angle of the wedge, to secure the best results, should not be over 30°. But, it has never been practicable to use a wedge on account of the one-sided pressure met with in tools having a clearance. Consequently, tools have been used which are not wedges and hence the duty has devolved upon the tool of crushing and changing the shape of the metal, severing or partly severing it into small chunks and cleaving or shearing off the chunks at an angle to the surface finished by the tool.

I have found as previously indicated, that I may form the cutter with two faces at an angle of substantially 30°, and that in actual practice the inner face of the tool may be caused to bear flatly against the face of the work by swiveling the tool and permitting it to have an oscillatory movement. The tool is preferably so mounted that the theoretical cutting edge is under the absolute control of the carriage although the cutter itself is free to swing about a center line coincident with the line of the theoretical edge.

Before explaining in detail the tools which are illustrated upon the drawings as containing the invention, it is desired to have it understood that the invention may be embodied in a variety of forms adapted for use on lathes, planers or the like; that it is not limited to the details which shall be described; that as the terms "top," "front" and "back" are merely relative terms, referring to the use of the tool in an engine lathe, the description of the tool used in any other position will be understood from its description in connection with a lathe; and that the phraseology which is employed is for the purpose of description and not of limitation.

Referring to Figs. 1 to 5 inclusive, I have illustrated a simple embodiment of the invention in which the cutter is indicated at 20. It consists of a bar comprising a shank 21 and an operative end 22. At the end 22, there is an outer face or top slope 23, which is at an acute angle to what may be termed the "inner face" 24. The face 24 corresponds, in a measure, to what has heretofore been called the "clearance face". At the end of the portion 22, there is a clearance face 25 which is at substantially an angle of 90° to the face 24. The faces 23 and 24 form a wedge, the angle of which may be, according to the character of the metal being turned, approximately 30°, more or less, so that the action of the cutter will be approximately that of splitting off the chip instead of crowding or scraping it off as heretofore. As previously stated, it is not necessary that the cutting edge 26, formed at the intersection of the two faces 23 and 24, should be straight. On the contrary, it may be curved in which event the face 24 will be convex. The cutter is here shown as so mounted that it is capable of oscillation substantially about the center of axis coincident with its cutting edge. It will be seen that the holder, which is indicated at 27, consists of a flat bar or plate, having along one side two parallel flanges 28, 29, which form a laterally open socket to receive the shank of the cutter. The flange 29 projects beyond the inner end of the holder so as to underlie the operative end of the cutter to support it. The upper wall of the flange 29 is concave, as indicated at 30, in cross-section the arc or curvature being concentric with the cutting edge 26 of the cutter, said edge 26 itself being coincident with the corner 31 of the shank 21. The flange or guideway 28 is recessed in its under face as at 32, and it is provided with a downwardly projecting lip or edge 33 which forms approximately a right angle to its inner face 34. This reëntrant corner is in a line concentric with the concave face 30, and it serves as a fulcrum or pivot in which the corner 31 of the shank of the cutter is placed and about which the cutter may be oscillated. The corner 31 of the shank is held against its fulcrum by adjusting screws 35 passed into the side of the holder and engaging a curved rib 36 on the other upper corner of the shank 21. These screws serve to hold the upper edge or corner 31 against the lip 33.

From this description, it will be apparent that the cutter is socketed in the holder so that it is capable of oscillation to a limited extent. To prevent the cutter from leaving its guideway, a removable stop locking device is employed consisting of a rotatable headed pin 37 inserted in the socket in the flange 29, the head being cut away, so that, by rotating the pin to the proper point, the cutter may be laterally removed past the cut-away portion of the head. Passing upwardly through the projecting end of the flange 29, there is a pin 38, the end of which is concave, as shown in Fig. 4, said pin fitting the convex under side 39 of the cutter and holding the cutter upwardly with its corner 31 in the socket formed by the lip 33. In order that the cutter may be adjusted longitudinally of its holder, there is provided an adjusting screw 40 which is passed transversely through a cylindrical head 41 of a bolt 42. The screw 40 has a head 43 which may be engaged with a socket 44 formed in the outer end of the shank of the cutter. The tool holder is illustrated as being mounted in the conventional tool-post 45 of the lathe slide 46.

It will be apparent that, when the cutter holder is fed along the work (shown in dotted lines in Figs. 1 and 2), the face 24 will tend automatically to position itself with reference to the face or shoulder of the work so as to lie flatly thereagainst, the chip which bears upon the top slope 23 maintaining the cutter in this position. Thus the wedge (the cutter) is presented in such relation to the work that the chip and the face of the work bear with a substantial equality of pressure against both faces of the wedge (or cutter); in other words, one face of the wedge-shaped cutter is placed flatly against the face of the work so that the chip is wedged off by the other face of the cutter which is at a wedging angle to the face or wall of the work. The inner face of the laterally open socket and the pin 37 serve as stops to limit the lateral oscillation of the cutter.

In Figs. 6 to 9 inclusive, there is illustrated a tool which may be employed with another form of engine lathe in which the cutter is supported directly in the lathe slide. The holder consists of a cylindrical block 46, provided at its inner end with an oblong aperture, the walls of which are rectangular. The other end of the holder is internally threaded to receive an adjusting screw 47, having on its inner end a head 48 which is connected to the head 49 on the end of the cutter bar by couplings 50. The cutter bar, which is indicated as a whole at 51, has an operative end 52, with a cutting edge 53 formed by the outer face or top slope 54 and the inner face 55. These faces form an acute angle, which, as shown, is approximately 30°. The cutting edge 53 is substantially a continuation of the corner 56 of the shank of the tool. The top side 57 of the shank is at an angle less than 90° to its side 58 which is in a plane with its face 55. Its other side 59 is at substantially a right angle to the top side 57, but is at an obtuse angle to its under side 60, which latter is at an angle less than 90° to its side 58. In cross-section the shank of the cutter is in the shape of a trapezium with its longest side upright. The height of the side wall 58 is substantially equal to the height of the socket in the holder 46, so that the corner 56 of the cutter shank is socketed in the angle formed by the side and top walls of the aperture. By reason of this construction, it will be seen that the cutter is capable of oscillating about the corner 56 and cutting edge 53 to a greater or less extent, so as to permit the face 55 of the operative end of the cutter to be pressed against the face of the work by the chip which is wedged or split off from the work and which engages the top slope 54 of the cutter.

In both of these embodiments of the invention, thus described, the cutter itself is capable of oscillation about a center coincident with its cutting edge, this oscillation being relatively to its holder.

In Figs. 10 to 18 inclusive, there is illustrated a tool in which a device is provided for adjusting or oscillating the cutter about its center of movement, and also a positive adjustable abutment for limiting the movement of the so-called clearance face of the tool away from the wall of metal from which the chip is being removed. The cutter 76 has substantially the same shape as that shown in Fig. 5. Its corner 77, which is in line with its cutting edge 78, is located in a reëntrant angle in a plate 79 which is attached to the holder 80 by any well known means. The holder, i. e. the body and the top plate 79, forms a laterally open socket for the lateral insertion of the cutter, said plate also clamping the under curved side of the cutter in its seat in the holder. The rib 81 on the cutter bears against a surface on the holder, as shown in Fig. 15. For the purpose of adjusting or oscillating the cutter about its center of oscillation, I employ a slide 82 located in a socket in the holder and having shoulders 83, 84 which embrace the thickest portion of the cutter, as shown in Fig. 14. This slide may be reciprocated by a cam or eccentric 85 formed on the end of a rock-shaft 86, which has a handle 87 by which it may be rocked. To resist the tendency of the cutter to swing outward away from the face of the work, there is employed an adjustable abutment 88 which may preferably consist of a screw passed into a threaded aperture in the holder and having its edge bearing against the thickest portion of the cutter, as shown in Fig. 13.

I do not herein claim the method or art of cutting metal which is herein disclosed, since the same forms the subject matter of my application Serial No. 410786, filed January 14, 1908. Nor do I herein claim broadly a metal cutting tool having faces at an acute angle to each other terminating in a cutting edge and swiveled with reference to the work so that one of said faces rests flatly against the face of the work, as the same forms the subject-matter of my application Serial No. 406,588 filed Dec. 16, 1907.

Having thus explained the nature of my said invention, and described a way of constructing and using the same, although without attempting to set forth all of the forms in which it may be made or all of the modes of its use, what I claim is:

1. In a metal-turning tool, a holder or carrier, a cutter having a substantially wedge-shape cutting end, and means on said carrier for moving said cutter about an axis substantially coincident with its cutting edge.

2. In a metal-turning tool, a holder or carrier, and a cutter comprising a bar or shank having at its end two faces at an acute angle to each other, terminating in a cutting edge longitudinal of said shank, said cutter being movable on said holder about an axis substantially coincident with said cutting edge.

3. In a metal-turning tool, a cutter comprising a bar or shank having a cutting edge substantially coincident with one corner thereof, and formed by two faces at an acute angle to each other, and a holder or carrier having means to receive said corner and to permit said cutter to rock about said corner.

4. In a metal-turning tool, a cutter comprising a bar or shank having a cutting edge substantially coincident with one corner thereof and formed by two faces at an acute angle to each other, a holder or carrier having means to receive said corner and to permit said cutter to rock about said corner, and adjustable means on said holder for supporting the under side of said cutter.

5. In a metal turning tool, a cutter comprising a bar or shank having on its upper side a cutting edge extending endwise thereof, and a curved under side or face, and a holder or carrier having a complemental curved seat to receive said curved side or face, and on which said under side or face of the cutter is adapted laterally to slide, and means for limiting the lateral sliding movement of said cutter.

6. In a metal-turning tool, a cutter comprising a bar or shank having a cutting edge substantially coincident with one corner thereof and formed by two faces at an acute angle to each other, said bar or shank having a curved under side or face, and a holder or carrier having a fulcrum to receive said corner, and having concave surfaces to fit said curved under side or face of said bar or shank, said concave surfaces and said curved under side or face being substantially concentric with the said fulcrum.

7. In a metal-turning tool, a holder or carrier, a cutter comprising a bar or shank having at its end two faces at an acute angle to each other, terminating in a cutting edge longitudinal of said shank, said cutter being movable on said holder about an axis substantially coincident with said cutting edge, and means for moving said cutter about said axis.

8. In a metal-turning tool, a cutter comprising a bar or shank having a cutting edge substantially coincident with one corner thereof, and formed by two faces at an acute angle to each other, a holder or carrier having means to receive said corner and to permit said cutter to rock about said corner, and means on said holder or carrier for positively resisting the end thrust of said cutter and permitting said rocking movement.

9. In a metal-turning tool, a cutter comprising a bar or shank having a cutting edge substantially coincident with one corner thereof and formed by two faces at an acute angle to each other, a holder or carrier having means to receive said corner and to permit said cutter to rock about said corner, and adjustable means on said holder or carrier for adjusting said cutter longitudinally of its cutting edge and permitting said rocking movement.

10. In a metal-turning tool, a cutter comprising a bar or shank having a cutting edge substantially coincident with one corner thereof and formed by two faces at an acute angle to each other, a holder or carrier having means to receive said corner and to permit said cutter to rock about said corner, and movable means for engaging said bar or shank and holding its corner in the said fulcrum.

11. In a metal-turning tool, a cutter comprising a bar or shank having a longitudinal cutting edge formed by faces at an angle less than a right angle, and a holder having in one side a socket to receive said cutter and to permit it to oscillate while in operation.

12. In a metal-turning tool, an elongated holder having in one face a socket to receive the cutter, and an overhanging lip; and a cutter consisting of a shank or bar having a longitudinal cutting edge and a portion to engage said lip, and stops on said holder between which said cutter is located, the said stops being separated a distance greater than the width of said cutter to permit an oscillation of said cutter.

13. In a metal-turning tool, a cutter having a longitudinal cutting edge, a holder therefor which permits a free oscillation of said cutter on an axis lengthwise of said cutting edge, and manually operated means for oscillating said cutter about said axis to cause its edge to bite into the work.

14. In a metal-turning tool, a cutter comprising a bar or shank having side faces at its end which form a longitudinal cutting edge, and a holder having a supporting surface on which the under face of said bar or shank rests and on which it may move transversely, said holder having a cap plate with a lip or projection for engaging the bar or shank.

15. In a metal-turning tool, a cutter consisting of a bar or shank having at one end a longitudinal cutting edge and having on its outer face a longitudinal rib, and a holder having a surface on which the under side of the bar or shank rests, a portion to engage the inner face of the bar or shank, and a member to engage the rib on said cutter, said engaging portion and said member being adjustable one relatively to the other, transversely of the said cutter.

16. In a metal-turning tool, a cutter consisting of a bar or shank having at one end a longitudinal cutting edge and having on its outer face a longitudinal rib, and a holder having a surface on which the under side of the bar or shank rests, a portion to engage the inner face of the bar or shank, and a member to engage the rib on said cutter, said engaging portion and said member being adjustable one relatively to the other, transversely of the said cutter, in combination with means on said holder for oscillating said shank about said engaging portion of the holder as a fulcrum.

17. In a metal turning tool, a cutter comprising a bar or shank having at one end an inner face and a top slope forming an acute angle and terminating in a cutting edge extending lengthwise of said bar or shank, a holder having an opening in one side into which said cutter may be laterally inserted and in which it may move laterally, and means on said holder for engagement with the sides of said cutter to prevent its lateral dislocation.

18. In a metal turning tool, a cutter comprising a bar or shank having at one end an inner face and a top slope forming an acute angle and terminating in a cutting edge extending lengthwise of said bar or shank, a holder having an opening in one side into which said cutter may be laterally inserted, means on said holder for engagement with the sides of said cutter to prevent its lateral dislocation while permitting it to move laterally, and means engaged with said cutter for adjusting it longitudinally.

19. In a metal turning tool, a cutter comprising a bar or shank having at one end an inner face and a top slope forming an acute angle and terminating in a cutting edge extending lengthwise of said bar or shank, a holder having a socket to receive the cutter and a projection to project downward over the inner side of the bar or shank, and one or more screws for engaging the outer side of said bar or shank and adjustable to permit the cutter to oscillate about a line substantially coincident with its cutting edge.

20. In a metal turning tool, a cutter comprising a bar or shank having at one end an inner face and a top slope forming an acute angle and terminating in a cutting edge extending lengthwise of said bar or shank, a holder having a socket in one side with a seat in which said cutter is seated to oscillate, said holder having a lip taking downwardly over the inner side of said cutter, one or more screws in said holder for engagement with the outer side of said cutter to hold it against said seat while permitting it to oscillate thereon, and means on said holder in positive engagement with said cutter for holding it against outward endwise movement.

21. In a metal turning tool, a cutter comprising a bar or shank having at one end an inner face and a top slope forming an acute angle and terminating in a cutting edge extending lengthwise of said bar or shank, said bar or shank having on its outer side near its top a longitudinally extending rib, a holder having a socket in one side with a seat for the cutter, and having a downwardly projecting lip taking over the inner side of said cutter, and means on said holder bearing against said rib.

In testimony whereof I have affixed my signature, in presence of two witnesses.

JAMES HARTNESS.

Witnesses:
MARCUS B. MAY.
P. W. PEZZETTI.